United States Patent [19]

Holtermann

[11] 4,204,384
[45] May 27, 1980

[54] LAWN MOWER INCLUDING MEANS FOR STOPPING ENGINE

[75] Inventor: Theodore J. Holtermann, Milwaukee, Wis.

[73] Assignee: Outboard Marine Corporation, Waukegan, Ill.

[21] Appl. No.: 935,615

[22] Filed: Aug. 21, 1978

Related U.S. Application Data

[63] Continuation of Ser. No. 705,140, Jul. 14, 1976, abandoned.

[51] Int. Cl.² ............................................. A01D 75/20
[52] U.S. Cl. ................................... 56/10.5; 123/182; 123/198 DC
[58] Field of Search .................. 56/10.5; 123/182, 110, 123/198 DC, 97 R, 97 B; 188/273

[56] References Cited

U.S. PATENT DOCUMENTS

| | | | |
|---|---|---|---|
| 2,440,483 | 4/1948 | Mennesson | 123/182 |
| 2,742,380 | 4/1956 | Peters | 123/182 |
| 2,778,349 | 1/1957 | Thommen | 123/182 |
| 3,893,440 | 7/1975 | Dooley | 123/182 |
| 3,955,653 | 5/1976 | Comer | 56/10.5 |

*Primary Examiner*—Jay N. Eskovitz
*Attorney, Agent, or Firm*—Michael, Best & Friedrich

[57] ABSTRACT

Disclosed herein is a lawn mower comprising a rotatable cutter blade supported on a frame, an internal combustion engine supported on the frame and including an engine block, a cylinder, and a reciprocative piston which is drivingly connected to the cutter blade, a valving arrangement for stopping the engine including an outlet port opening into the cylinder combustion chamber, a discharge port, a valve which is interposed the outlet and discharge ports and is movable between open and closed positions to respectively permit and block communication between the outlet and discharge ports, and a valve member which, in response to the combustion chamber pressure, opens to vent gases from the combustion chamber during the compression stroke of the piston and closes to prevent entry of gases through the discharge port into the combustion chamber during the expansion stroke of the piston, and a spring for biasing the valve toward the open position. Operation of the valve is controlled by a control mechanism which is movable between an operating position and a non-operating position corresponding to the open position of the valve and is biased to the non-operating position by the spring.

13 Claims, 8 Drawing Figures

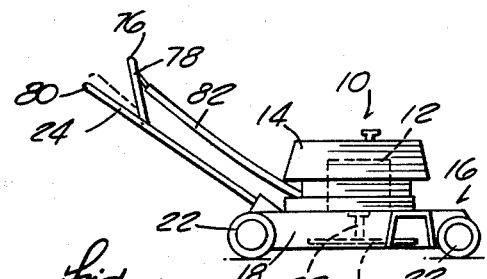
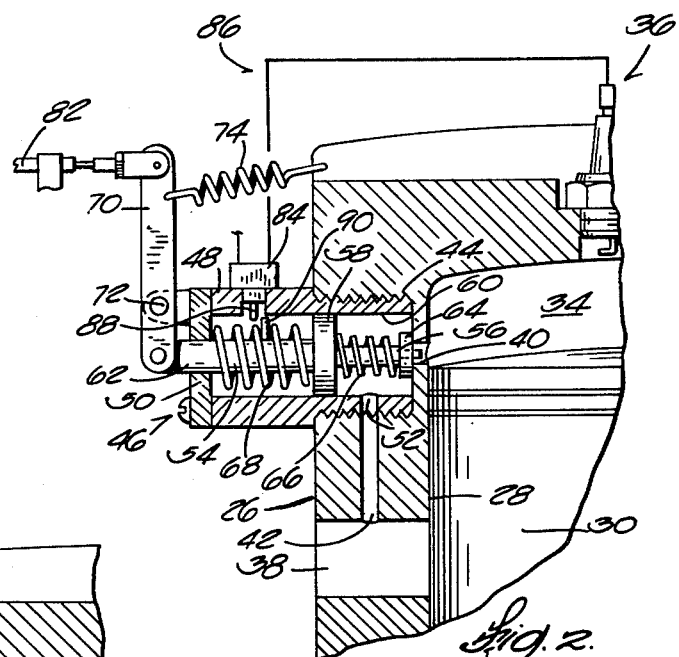
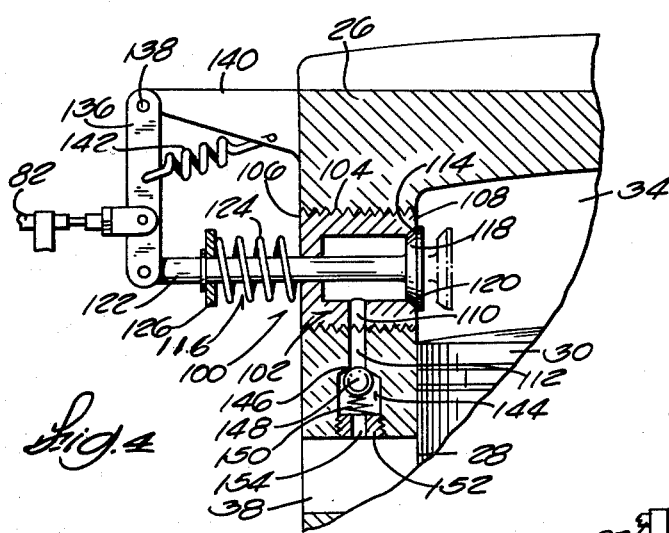
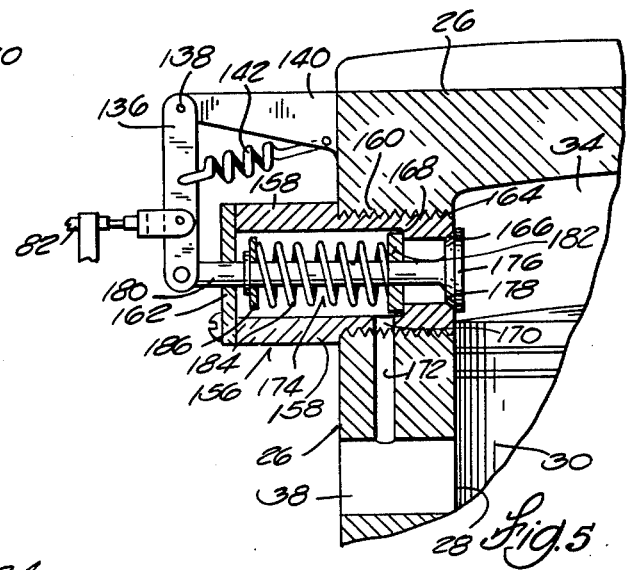
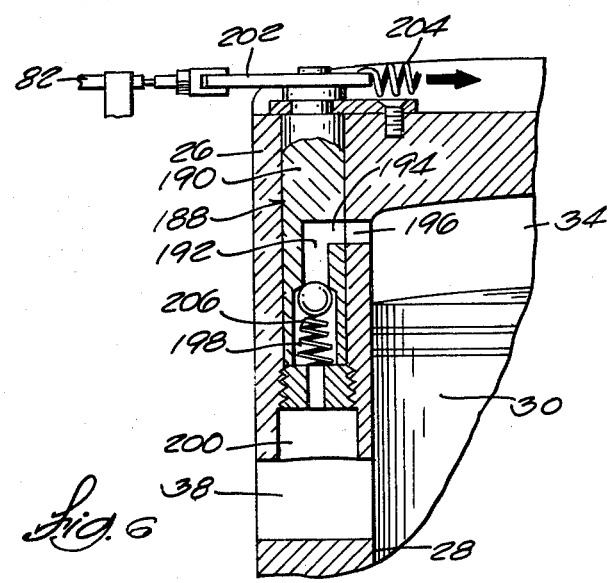
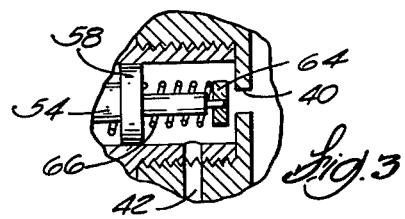

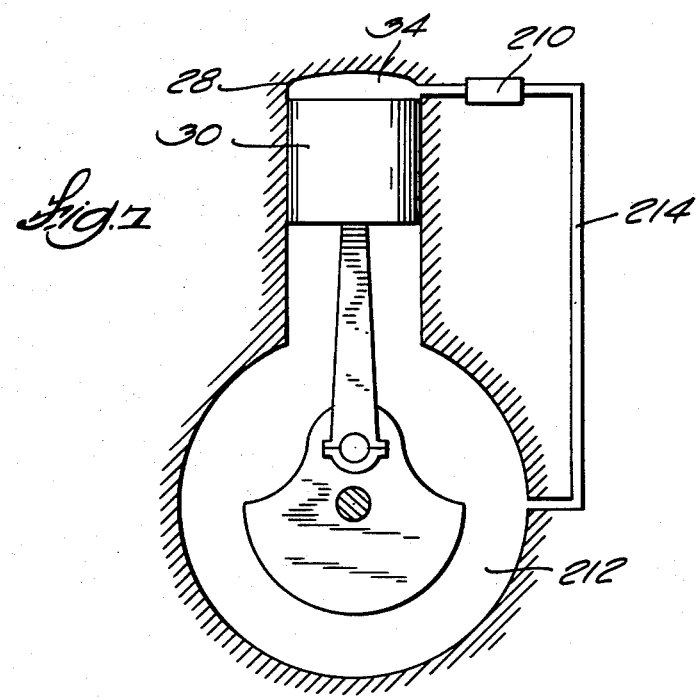
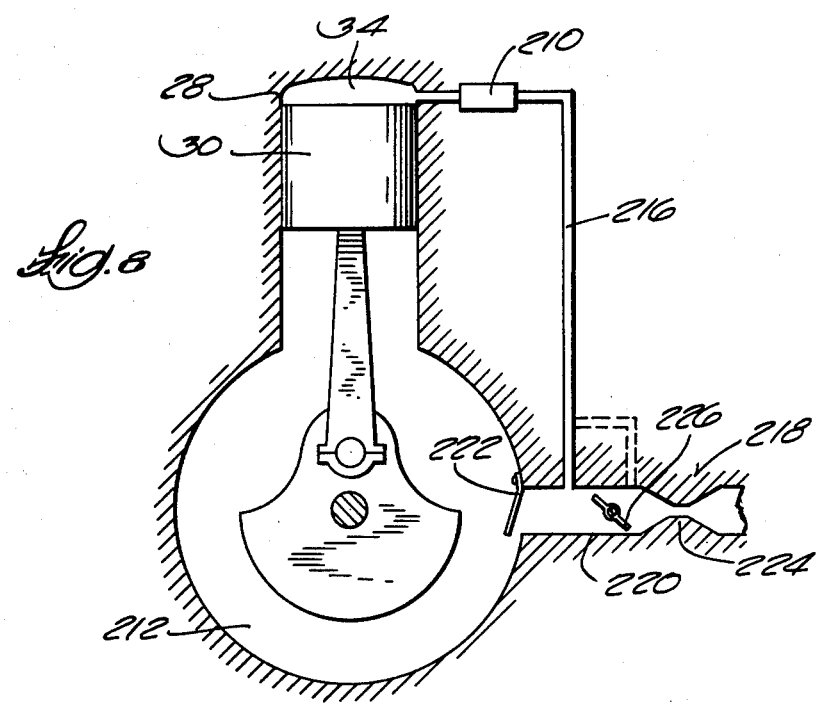

LAWN MOWER INCLUDING MEANS FOR STOPPING ENGINE

CROSS REFERENCE TO RELATED APPLICATIONS

This application is a continuation of application Ser. No. 705,140, filed July 14, 1976 and now abandoned.

BACKGROUND OF THE INVENTION

The invention relates to lawn mowers. More particularly, the invention relates to lawn mowers operated by an internal combustion engine and including selectively operable arrangements for rapidly stopping the engine.

In order to reduce the time during which the cutter blade of a rotary lawn mower continues to rotate after the engine ignition has been shut off, it is desirable to reduce the time required for the engine to come to a complete stop.

Attention is directed to the following U.S. Pat. Nos:
Thommen; 2,778,349; Jan. 22, 1957
Haller; 2,968,295; Jan. 17, 1961
Haller; 3,326,194; June 20, 1967
Boling; 3,638,632; Feb. 1, 1972
Bygdnes; 3,677,435; June 6, 1972
Knebel; 3,707,592; Jan. 2, 1973
Bonewitz; 3,888,218; June 10, 1975
Harper et al; 3,889,646; June 17, 1975

SUMMARY OF THE INVENTION

The invention provides a lawn mower comprising a frame, a rotatable cutter blade supported on the frame, an internal combustion engine supported on the frame and including an engine block having a cylinder and a piston mounted inside the cylinder for reciprocative compression and expansion strokes and cooperating with the cylinder to form a combustion chamber, and means for stopping the engine including an outlet port in the engine block opening into the combustion chamber, a discharge port, and valve means interposed the outlet and discharge ports and having an internal flow passage. The valve means is movable between an open position where the flow passage is communicable between the outlet and discharge ports and a closed position where communication between the outlet and discharge ports is blocked and includes a valve member, operable in response to the pressure in the combustion chamber when the valve means is in the open position, for selectively opening and closing communication between the outlet and discharge ports.

The valve member opens to permit gases to vent from the combustion chamber through the discharge port during the piston compression stroke and closes to block communication between the discharge and outlet ports and to thereby prevent gases from entering the combustion chamber through the discharge port during the piston expansion stroke. Means is provided for biasing the valve means toward the open position. Operation of the valve means is controlled by a control which is operatively connected to the biasing means and the valve means and is movable between an operating position where the biasing force of the biasing means is overcome and the valve means is moved to the closed position and a non-operating position where the biasing means biases the valve means to the open position.

In accordance with one embodiment of the invention, the engine block includes a surface spaced outwardly from the cylinder inner wall and surrounding the outlet port to serve as a valve seat and the valve means includes a hollow body mounted on the engine block and having an open end communicating with the outlet port and an aperture communicating with the discharge port, a guide member mounted for relative axial movement within the body and having an inner end portion, a closure member disposed between the guide member inner end portion and the valve seat for sealingly engaging the valve seat, first spring means carried by the guide member for urging the closure member toward the valve seat, and second spring means for urging the guide member inner end portion into abutment with the closure member and holding the closure member in the closed position. In this embodiment, the control means is operable to move the guide member axially against the biasing force of the second spring means to a position where the guide member inner end portion is spaced from the closure member so that the closure member thereafter moves away from the valve seat to open the outlet port, when the chamber pressure force acting on the closure member is greater than the biasing force of the first spring means during the piston compression stroke, and so that the first spring means returns the closure member to the closed position, when the combustion chamber pressure decreases to a predetermined level during the piston expansion stroke.

In accordance with another embodiment of the invention, the valve means comprises a hollow body mounted on the engine block and having an open end portion which communicates with the combustion chamber and has an annular seat defining the outlet port, an aperture in the body communicating with the discharge port, a closure member mounted in the body, and spring means for urging the closure member toward the closed position, and the biasing means overrides the spring means and moves the closure member to the open position when the control means is in the non-operating position. In this embodiment, the flow of gas from and into the combustion chamber is controlled, when the closure member is in the open position, by a one-way check valve interposed the closure member and the discharge port.

In accordance with another embodiment of the invention, the valve means includes a hollow body mounted on the engine block and having an open end portion which communicates with the combustion chamber and has a first annular valve seat located adjacent the cylinder inner wall and defining said outlet port, an aperture in the body communicating with the discharge port, a second annular valve seat interposed the first valve seat and the body aperture, a first closure member including a guide member, a second closure member slidably carried by the guide member, and spring means carried by the guide member and bearing against the second closure member for urging both the first and second closure members toward the closed position. In this embodiment, the control means is operatively connected to the guide member and is operable, when in the non-operating position, to permit the biasing means to move the first closure member to the open position against the force of the spring means and the second closure member is thereafter free to move to the open position, when the combustion chamber pressure force acting thereon during the piston compression stroke is greater than the biasing force of the spring means.

In another embodiment, the valve means comprises a rotatable member rotatably mounted in the engine block and including an internal passage having an inlet portion which is registerable with the outlet port and an outlet portion which is in communication with the discharge port, means for rotating the rotatable member between an open positon where the inlet portion is in registration with the outlet port and a closed position where the inlet portion is out of registration with the outlet port, and a one-way check valve means interposed the outlet and discharge ports and operable, when the rotatable member is in the open position, to permit gas flow from the combustion chamber during the piston compression stroke and to prevent gas flow into the combustion chamber during the piston expansion stroke.

In accordance with another embodiment of the invention, the lawn mower further includes a handle on the frame and the control means includes a control member movably mounted on the handle. The control member is located in an operating position adjacent a portion of the handle portion when the valve is in a closed position and is located in a non-operating position spaced from the handle portion when the valve is in the open position.

In accordance with another embodiment, the engine includes a switch connected to the engine ignition circuit and selectively operable to interrupt the ignition current to the spark plug and either the control means or the valve includes means for operating the switch to interrupt the circuit when the control means is in the non-operating position.

In further accordance with the invention, the discharge port is connected in communication with the engine exhaust passage or port, the engine crankcase, or the fuel-air induction passage from the engine carburetor.

One of the principal features of the invention is the provision of a lawn mower including an internal combustion engine for driving a cutter blade and means for rapidly stopping the engine upon termination of ignition.

Another of the principal features of the invention is the provision of a lawn mower referred to in the previous paragraph including a simplified valving arrangement for creating a partial vacuum in the engine combustion chamber to stop reciprocation of the piston.

Another of the principal features of the invention is the provision of a lawn mower referred to in the previous paragraph including a control means which has a control member and is operable, when in a non-operating position, to simultaneously interrupt the engine ignition circuit and actuate the valving arrangement to an engine stopping position, which control member must be held in an operating position to permit starting and continued operation of the engine.

Other features and advantages of the embodiments of the invention become apparent upon reviewing the following detailed description, the drawing and the appended claims.

BRIEF DESCRIPTION OF THE DRAWINGS

FIG. 1 is a side elevational view of a lawn mower embodying various of the features of the invention.

FIG. 2 is an enlarged, fragmentary view, partially in section and partially schematic, of the engine stopping means incorporated in the lawn mower of FIG. 1 with the valve assembly thereof shown in a closed position for normal engine operation.

FIG. 3 is an enlarged fragmentary, sectional view of the valve assembly of FIG. 2 shown in the fully open position during the compression stroke of the engine piston.

FIG. 4 is an enlarged, fragmentary view, partially in section, of a second embodiment of the engine stopping means.

FIG. 5 is an enlarged, fragmentary view, partially in section, of a third embodiment of the engine stopping means.

FIG. 6 is an enlarged, fragmentary view, partially in section, of a fourth embodiment of an engine stopping means.

FIG. 7 is a simplified, schematic elevation view of an alternate arrangement for the discharging of gases from the engine cylinder when the valve assembly of the engine stopping means is opened.

FIG. 8 is a simplified, schematic elevation view of another alternate arrangement for discharging the gases from the engine cylinder when the valve assembly of the engine stopping means is opened.

DETAILED DESCRIPTION

Before explaining the embodiments of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Illustrated in the drawing is a lawn mower 10 including an internal combustion engine 12, preferably a conventional 2-cycle engine, partially covered by a shroud 14 and supported on a frame 16 including a blade housing 18. The lawn mower 10 also includes a rotary cutter blade 20 located inside the blade housing 16 and is supported for travel along the ground by front and rear wheels 22. The lawn mower 10 is guided by a handle 24 suitably mounted on the frame 16.

The engine 12 has an engine block 26 including one or more cylinders 28. In each cylinder 28 is a reciprocative piston 30 which is drivingly connected to the cutter blade 20 such as by a crankshaft (not shown) which in turn is drivingly connected to a drive shaft 32 carrying the cutter blade 20. The piston 30 cooperates with the cylinder 28 to form a combustion chamber 34. A combustible charge comprising a mixture of air and gasoline is introduced into the combustion chamber 34 through an intake (not shown) in a conventional manner and is compressed therein during the upstroke or compression stroke of the piston 30. The compressed charge is ignited by a spark plug 36 located in the head or top of the cylinder 28 and the subsequent combustion increases the pressure of the confined gases. These gases expand during the downstroke or expansion stroke of the piston 30 and the combustion products are exhausted to the atmosphere near the end of the expansion stroke through an exhaust passage or port 38 and a muffler (not shown).

When ignition is shut off, the piston 30 normally continues to reciprocate for some time (e.g., 4 seconds or more) with a consequent continued rotation of the cutter blade 20. Stopping time of the engine, and thus the cutter blade, is reduced by providing a valving arrangement which vents the combustion chamber 34 during the compression stroke of the piston 30 but prevents the entry of gases into the combustion chamber 34 during the expansion stroke of the piston 30 so as to create a partial vacuum in the combustion chamber 34.

Referring to the specific construction illustrated in FIGS. 1-3, such a valving arrangement includes an outlet port 40 provided in the engine block 26 and opening into the combustion chamber 34, preferably at a location near the top end of the cylinder 28 not swept by the piston 30 during normal engine operation, and a discharge port 42 opening to the atmosphere. In the illustrated construction the discharge port 42 is provided in the engine block and opens into the exhaust port 38 or is connected directly to the muffler by a separate conduit means. The outlet port 40 and the discharge port 42 communicate through a tapped aperture 44 provided in the engine block 26. A portion of the bottom wall of the aperture 44 surrounding the outlet port 40 is adapted to serve as a valve seat as described hereinafter.

Threadably mounted in the aperture 44 is a valve assembly 46 including an externally threaded hollow housing or body 48. The outer end of the valve body 48 is closed by a cap 50 and the inner end of the valve body 48 is open to communicate with the outlet port 40. The interior of the valve body 48 is connected in communication with the discharge port 42 by an aperture 52 provided in one side of the valve body 48.

Mounted in the valve body 48 for relative axial movement is a guide member 54 having an inner end portion 56, a fixed collar 58 which slidably engages the interior wall 60 of the valve body 48 and an outer end portion 62 which extends outwardly and slidably through the cap 50. Suitably supported and guided adjacent the guide member inner end portion 56 and the bottom wall of the aperture 44 is a disc-shaped closure member 64. The closure member 64 overlies the outlet port 40 and is urged into sealing engagement with a portion of the bottom wall of the aperture 44, to close the outlet port 40, by a first coiled compression spring 66 encircling the guide member 54 with one end bearing against the collar 58 and the other end attached to or bearing against the closure member 64.

During normal engine operation, the closure member 64 is held in the closed position by a second coiled compression spring 68 which encircles the guide member 54 with one end bearing against the cap 50 and the other end bearing against the collar 58 so as to urge the guide member inner end portion 56 into abutment with the closure member 64 as shown in FIG. 2.

The lawn mower 10 is provided with a control means which is operable between an operating position and a non-operating position and must be in the operating position to permit the engine to be started and/or continue to operate. While various arrangements can be used, in the specific construction illustrated, such control means includes means for biasing the guide member 54 in an axial direction away from the closure member 64 (i.e., to the left as viewed in FIGS. 2 and 3) so that the closure member 64 is free to be forced to an open position, against the biasing force of the first spring 66, by the combustion chamber pressure force acting thereon during the compression stroke of the piston 30 as shown in FIG. 3.

More specifically, the biasing means includes an operating link 70 which is pivotally connected at one end to the outer end portion 62 of the guide member 54, is pivotally mounted at 72 on the valve body 48, and is urged in a clockwise direction, as viewed in FIG. 2, by a tension spring 74 which is connected between the operating link 70 and the engine block 26 and has sufficient tension to override the biasing force of the second spring 68.

The control means also includes a control handle or member 76 (FIG. 1) which is pivotally mounted on the guide handle 24 and includes a part 78 which is movable between an operating position adjacent a portion 80 of the guide handle 24 (i.e., the dashed line position in FIG. 1) and a non-operating position spaced from the guide handle portion 80 (i.e., the solid line position in FIG. 1). The control member 76 is connected to the operating link 70 through a suitable linkage arrangement, such as the illustrated push-pull arrangement or cable 82 which connects the control member 76 to the other end of the operating link 70. Other suitable linkages can be employed. The linkage is arranged so that, when the control member part 78 is in the non-operating position, the operating link 70 is in a non-operating position where the guide member inner end portion 56 is spaced from the closure member 64 as shown in FIG. 3 and so that, when the control member part 78 is in the operating position, the operating link 70 is in an operating position where the guide member inner end portion 56 is in abutment with the closure member 64 as shown in FIG. 2.

The control means preferably also includes means for shutting off the engine ignition when the control member part 78 is in the non-operating position. While various arrangements can be used, in the specific construction illustrated in FIG. 2, a conventional on-off switch 84 is interconnected in the engine ignition circuit 86 (illustrated schematically). The switch 84 is mounted on the valve body 48 and includes an actuation plunger 88 which is engageable with a lug 90 provided on the guide member 54. When the control member part 78 (and thus the guide member 54) is in the operating position, the switch 84 is closed and ignition current is supplied to the spark plug 36. When the control member part 78 (and thus the guide member 54) is in the non-operating position, the guide member lug 90 engages the switch plunger 88 and opens the switch 84, interrupting the ignition current to the spark plug 36 so that the engine 12 cannot be started or is shut off.

In operation, when the control member part 78 is in the operating position, the engine can be started and/or operated in the normal manner. When the control member part 78 is released, the spring 74 moves the guide member 54, via the operating link 70, to the non-operating position shown in FIG. 3, causing the termination of the ignition current. During the subsequent compression stroke of the piston 30, the pressure developed inside the combustion chamber 34 and acting on the closure member 64 overrides the force of the first spring 66 and moves the closure member 64 away from the outlet port 40, permitting gases in the combustion chamber 34 to vent to atmosphere via the discharge port 42 and the exhaust port 38. During the return or expansion stroke of the piston 30, a reduced pressure exists in the combustion chamber 34 and the first spring 66 urges the closure member 64 back into sealing engagement with the outlet port 40, thereby preventing atmospheric air from entering the combustion chamber 34. This creates a partial vacuum in the combustion chamber 34, causing the piston 30 to rapidly cease reciprocating, e.g., within about 2 seconds.

When the control member part 78 is returned to the operating position, the linkage pivots the operating link 70 against the biasing force of the spring 74, in a counterclockwise direction as viewed in FIG. 2, to a position where the second spring 68 urges the guide member inner end portion 56 into abutment with the closure member 64 and holds the closure member in the closed position so that the engine can be started and operated in a normal manner.

In the embodiment illustrated in FIG. 4, the valve means includes a valve assembly 100 having a hollow, externally threaded body 102 which is threaded into a tapped aperture 104 provided in the engine block 26 and opening into the combustion chamber 34, preferably at a location near the top of the cylinder 28 not swept by the piston 30. The valve body 102 has a closed outer end 106, has an open inner end 108 which is located adjacent the inner wall of the cylinder 28 and communicates with the combustion chamber 34 and has an aperture 110 which communicates with an axially extending flow passage 112 provided in the engine block 26 between the aperture 104 and the exhaust port 38 to serve as a discharge port. The inner end 108 of the valve body 102 has a tapered annular seat 114 which defines a combustion chamber outlet port.

Mounted for relative axial movement inside the valve body 102 is a valve member 116 including a closure member 118 having a tapered annular seating surface 120 adapted to sealingly engage the seat 114 and a stem or guide member 122 which extends outwardly and slidably through the outer end 106 of the valve body 102. The closure member 118 is urged into sealing engagement with the seat 114 by a coiled compression spring 124 encircling the outer end portion of the guide member 122 with one end bearing against the outer end 106 of the valve body 102 and the other end bearing against a spring keeper 126 mounted on the guide member 122.

Movement of the valve member 116 is controlled through an operating link 136 which is pivotally connected at one end to the outer end of the guide member 122. The operating link 136 is pivotally mounted at 138 on an arm 140 extending from the engine block 26 and is urged in a counterclockwise direction (as viewed in FIG. 4) by a tension spring 142 which is connected between the operating link 136 and the arm 140 and has sufficient tension to override the biasing force of the spring 124 so as to move the closure member 118 to the open position shown by the dashed lines in FIG. 4.

The operating link 136 can be operated by the control member 76 in the same general manner as the embodiment illustrated in FIGS. 1 and 2. That is, the control member 76 is connected to the operating link 136 at an intermediate point thereof through a suitable linkage, such as the cable 82. The linkage is arranged so that, when the control member part 78 is in the operating position, the operating link 136 is pivoted in a clockwise direction (as viewed in FIG. 4) against the biasing force of the spring 142 and the closure member 118 is urged to the closed position by the spring 124 and, when the control member part 78 is in the non-operating position, the operating link 136 is released so that it can be pivoted in a counterclockwise direction by the spring 142 and the closure member 118 is moved to the open position.

When the closure member 118 is in the open position, the flow of gases from and into the combustion chamber 34 is controlled by a one-way check valve means located between the closure member 118 and the exhaust port 38. While various arrangements can be used, in the specific construction illustrated, such check valve means includes a spring-loaded ball check valve assembly 144 located in the flow passage 112. More specifically, the flow passage 112 includes a tapered seat 146 and a ball valve 148 is urged into sealing engagement with the seat 146 by a spring 150 held in place by a spring keeper 152 having a central aperture 154.

In operation, when the control member part 78 is in the operating position, the valve member 118 is in the closed position and the engine can be started and operated in a normal manner. When the control member 76 is released, the spring 142 moves the closure member 118, via the operating link 136, to the open position. During the subsequent compression stroke of the piston 30, the pressure developed inside the combustion chamber opens the ball valve 148 permitting the pressure in the combustion chamber 34 to vent to atmosphere via the flow passage 112, the spring keeper aperture 154 and the exhaust port 38. During the return or expansion stroke of the piston 30, the spring 150 urges the ball valve 148 back into sealing engagement with the seat 146, thereby preventing atmospheric air from entering the combustion chamber 34 and causing the creation of a partial vacuum in the combustion chamber as described above.

In the embodiment illustrated in FIG. 5, the operating link 136 and the linkage connecting the operating link 136 to the control member 76 are arranged and operate in generally the same manner as the embodiment illustrated in FIG. 4. Also, the valve assembly 156 operates in a manner similar to the valve assembly 100 of the embodiment illustrated in FIG. 4. However, instead of using a ball check valve assembly, the valve assembly 156 incorporates an internal one-way check valve means.

More specifically, the valve assembly 156 includes a hollow, externally threaded body 158 which is threaded into a tapped aperture 160 similar to the aperture 104 of the embodiment illustrated in FIG. 4. The outer end of the valve body 158 is closed by a cap 162 and the open inner end 164 thereof is located adjacent the inner wall of the cylinder 28 and communicates with the combustion chamber 34. The inner end 164 of the valve body 158 has a tapered, first annular seat 166 which defines a combustion chamber outlet port and a substantially flat, second annular seat 168 spaced outwardly from the first seat 166. The valve body 158 also includes an aperture 170 which communicates with an axially extending flow passage 172 provided in the engine block 26 between the aperture 170 and the exhaust port 38 to serve as a discharge port. The second seat 168 is located between the first seat 166 and the aperture 170.

Mounted for relative axial movement within the valve body 158 is a valve member 174 including a first closure member 176 having a tapered annular seating surface 178 adapted to sealingly engage the first seat 166 and a stem or guide member 180 which extends outwardly and slidably through the cap 162. Slidably carried on the guide member 180 is a disc-shaped, second closure member 182 which is adapted to sealingly engage the second seat 168. Both the first and second closure members 176 and 182 are urged into sealing engagement with their respective seats 166 and 168 by a coiled compression spring 184 encircling the guide member 180 with one end bearing against the second closure member 182 and the other end bearing against a spring keeper 186 mounted on the guide member 180.

In operation, when the control member part 78 is in the operating position, the first and second closure members 176 and 182 are in the positions shown in FIG. 5 and the engine can be started and operated in a normal manner. When the control member 76 is released, the spring 142 moves the first closure member 176, via the operating link 136, to the open position (i.e., to the right as viewed in FIG. 5). During the subsequent compression stroke of the piston 30, the pressure developed inside the combustion chamber 34 and acting on the second closure member 182 overrides the force of the spring 184 and moves the second closure member 182 away from its seat 168, thereby permitting the pressure in the combustion chamber 34 to be vented to atmosphere via the flow passage 172. During the return or expansion stroke of the piston, the spring 184 urges the second closure member 182 back into sealing engagement with the seat 168, thereby preventing atmospheric air from entering the combustion chamber 34 and causing the creation of a partial vacuum in the combustion chamber as described above.

In the embodiment illustrated in FIG. 6, the valve assembly 188 includes an elongated rotary valve member 190 rotatably mounted in the engine block 26. The rotary valve member 190 has an internal flow passage 192 including an inlet portion 194 which is registerable with an outlet port 196 opening into the combustion chamber 34 and an outlet portion 198 which communicates with the exhaust port 38 via a discharge port 200.

An operating link 202 is operably connected to the upper or outer end of the rotary valve member 190 for rotating the rotary valve member 190 between an open position, where the flow passage inlet portion 194 is in registration with the outlet port 196 as shown in FIG. 6, and a closed position, where the flow passage inlet portion 194 is out of registration with the outlet port 196. The operating link 202 is biased to a position corresponding to the open position of the rotary valve member 190 by a tension spring 204 connected between the operating link 202 and the engine block 26.

The operating link 202 can be operated by the control member 76 in the same general manner as the embodiment illustrated in FIGS. 1 and 2. That is, the control member 76 is connected to the operating link 202 through a suitable linkage, such as the cable 82. The linkage is arranged so that, when the control member part 78 is in the operating position, the operating link 202 is rotated against the biasing force of the spring 204 and is moved to a position where the rotary valve member 190 is in the closed position and, when the control member part 78 is in the non-operating position, the operating link 202 is released to permit the spring 204 to rotate the rotary valve member 190, via operating link 202, to the open position shown in FIG. 6.

When the rotary valve member 190 is in the open position, the flow of gas from and into the combustion chamber 34 through the outlet port 196 is controlled by a one-way check valve means located between the outlet port 196 and the discharge port 200. While various arrangements can be used, in the specific construction illustrated, such check valve means comprises a spring-loaded ball check valve assembly 206 which is located in the outlet portion 198 of the flow passage 192 and which is arranged and operates in the same general manner as the ball check valve assembly 144 of the embodiment illustrated in FIG. 4.

Other suitable one-way check valve means can be used, such as a folded leaf spring member which is mounted to cover and close the outlet port 196 when the rotary valve member 190 is in the open position and which is arranged to be flexed to an open position, where gas can flow from the outlet port 196 and through the flow passage 192 during the compression stroke of the piston 30, and to spring back to the closed position during the expansion stroke of the piston 30.

It should be understood that the ignition circuit interrupting feature illustrated in FIG. 2 can be incorporated into the embodiment illustrated in FIGS. 4–6.

The gases vented from the combustion chamber 34 normally will contain some unburned fuel. FIGS. 7 and 8 illustrate arrangements for venting these gases so as to maximize fuel utilization and/or minimize pollution. Any one of the above-described valving arrangements is illustrated diagrammatically by 210 in FIGS. 7 and 8.

In the alternate venting arrangement illustrated in FIG. 7, the discharge portion of the venting arrangement 210, such as the discharge port 42 in FIGS. 2 and 3, is connected in communication with the engine crankcase 212 by a conduit means 214. The pressure inside the crankcase 212 increases during the expansion stroke of the piston 30 and decreases during the compression stroke of the piston 30.

Thus, when the control member part 78 described above is released, gases in the combustion chamber 34 are vented through the valving arrangement 210 and into the crankcase 212 during the compression stroke of the piston 30, at which time a reduced pressure exists in the crankcase 212. During the subsequent expansion stroke of the piston 31, the pressure in the crankcase 212 is considerably higher than the pressure in the combustion chamber 34, causing closure of the blocking valve member of the valving arrangement 210, such as the closure member 64 in FIGS. 2 and 3, to prevent gases in the crankcase 212 from entering the combustion chamber 34 in the same manner described above.

In the alternate venting arrangement illustrated in FIG. 8, the discharge portion of the valving arrangement 210 is connected, via a conduit means 216, with the engine fuel supply system 218 which includes a carburetor (partially shown) and a fuel-air induction passage 220 connecting the carburetor to the crankcase 212 through a reed valve 222. The fuel-air induction passage 220 includes a venturi section 224 and a throttle valve 226 located downstream of the venturi section 224. The conduit means 216 can be connected to the fuel-air induction passage 220 either downstream of the throttle valve 226 as shown by the solid lines or upstream of the throttle valve 226 and downstream of the venturi section 224 as shown by the dashed lines.

Thus, when the control member part 78 described above is released, gases in the combustion chamber are vented through the valving arrangement 210 and into the fuel-air induction passage 220 for subsequent recycling to the crankcase 212 and/or the combustion chamber 34. A reduced pressure exists in the fuel-air induction passage 220 by virtue of the reed valve 222 opening in response to the reduced pressure in the crankcase 212. During the expansion stroke of the piston, the pressure inside the fuel-air induction passage 220 is greater than the pressure in the combustion chamber 34, causing closure of the blocking valve member of the valving arrangement 210 to prevent gases from the fuel-air induction passage 220 from entering the combustion chamber 34 in the same manner as described above.

Various of the features of the invention are set forth in the following claims.

What is claimed is:

1. A lawn mower comprising a frame, a rotatable cutter blade supported on said frame, an internal combustion engine supported on said frame and including an engine block having a cylinder and a piston mounted inside said cylinder for reciprocative compression and expansion strokes and cooperating with said cylinder to form a combustion chamber, means for stopping said engine including an outlet port in said engine block opening into said combustion chamber, a discharge port communicable with said outlet port, valve means including an internal flow passage interposed said outlet and discharge ports and a valve control element operable in said flow passage between a first position for permitting communication between said outlet and discharge ports and a second position for blocking communication between said outlet and discharge ports, said valve means also including a valve assembly, operable in response to the pressure in said combustion chamber when said valve control element is in the first position, to selectively permit and block communication between said outlet and discharge ports whereby said valve assembly is moved to an open position to permit gases to vent from said combustion chamber through said discharge port during the compression stroke of said piston and said valve assembly is moved to a closed position to prevent gases from entering said combustion through said discharge port during the expansion stroke of said piston, means for biasing said valve control element toward the first position, and control means operatively connected to said biasing means and said valve control element and movable between an operating position where the biasing force of said biasing means is overcome and said valve control element is moved to the second position and a non-operating position where said biasing means moves said valve control element to the first position.

2. A lawn mower according to claim 1 wherein said engine includes an exhaust port in said engine block for exhausting gases from said combustion chamber during the expansion stroke of said piston and wherein said discharge port is connected in communication with said exhaust port.

3. A lawn mower according to claim 1 wherein said engine includes a crankcase and wherein said discharge port is connected in communication with said crankcase.

4. A lawn mower according to claim 1 wherein said engine includes a crankcase and a fuel-air induction passage communicating with said crankcase and wherein said discharge port is connected in communication with said fuel-air induction passage.

5. A lawn mower according to claim 1 wherein said cylinder includes an inner wall, wherein said engine block includes a surface spaced outwardly from said cylinder inner wall and surrounding said outlet port to serve as a valve seat, wherein said valve means includes a hollow body defining a portion of said flow passage mounted on said engine block, said body having an open end communicating with said outlet port and an aperture communicating with said discharge port, wherein said valve control element includes a guide member having an inner end portion and mounted for movement within said body relative to said valve seat between first and second positions, wherein said valve assembly includes a closure member carried by said guide member for movement relative to said valve seat between the closed position in sealing engagement with said valve seat to close said outlet port and the open position disengaged from said valve seat, first spring means carried by said guide member for urging said closure member toward the closed position, and second spring means for urging said guide member toward the second position whereby said inner end portion thereof abuts said closure member and releasably holds said closure member in the closed position, and wherein said control means is operable to move said guide member axially against the biasing force of said second spring means to the first position wherein the said guide member inner end portion is spaced from said closure member to permit said closure member to be moved to the open position when the chamber pressure force acting on said closure member is greater than the biasing force of said first spring means during the compression stroke of said piston and said first spring means returns said closure member to the closed position when the combustion chamber pressure decreases to a predetermined level during the expansion stroke of said piston.

6. A lawn mower according to claim 1 wherein said valve means includes a hollow body defining a portion of said flow passage mounted on said engine block, said body including an open end portion communicating with said combustion chamber and having an annular seat defining said outlet port and further including an aperture communicating with said discharge port, wherein said valve control element includes a closure member mounted in said body for movement relative to said seat between the second position in sealing engagement with said seat and the first position disengaged from said seat and spring means for urging said closure member toward the second position, wherein said biasing means overrides said spring means and moves said closure member to the first position when said control means is in the non-operating position, and wherein said valve assembly comprises a one-way check valve interposed said closure member and said discharge port and operable, when said closure member is in the first position, to permit gas flow from said combustion chamber to said discharge port during the compression stroke of said piston and to prevent gas flow from said discharge port into said combustion chamber during the expansion stroke of said piston.

7. A lawn mower according to claim 6 wherein said check valve means comprises a spring-loaded ball check valve disposed in said discharge port.

8. A lawn mower according to claim 1 wherein said cylinder has an inner wall, wherein said valve means includes a hollow body defining a portion of said flow passage mounted on said engine block, said body including an open end portion which communicates with said combustion chamber and has a first annular valve seat located adjacent said cylinder inner wall and defining said outlet port, an aperture communicating with said discharge port, and a second annular valve seat interposed said first valve seat and said aperture, wherein said valve control element includes a first closure member having a guide member and mounted in said body for movement relative to said first valve between the second position in seating engagement with said first valve seat and the first position disengaged from said first valve seat, wherein said valve assembly includes a second closure member slidably carried by said guide member for movement relative to said second valve seat between the closed position in seating engagement with said second valve seat and the open position disengaged from said second valve seat and further includes spring means carried by said guide member and bearing against said second closure member for urging said closure member toward the second position and for also urging said second closure member toward the closed position, and wherein said control means is operatively connected to said guide member and is operable, when in the non-operating position, to permit said biasing means to move said first closure member to the first position against the force of said spring means, so that said second closure member is moved to the open position, when the combustion chamber pressure force acting thereon is greater than the biasing force of said spring means during the compression stroke of said piston and so that said spring means returns said second closure member to the closed position when the combustion chamber pressure decreases to a predetermined level during the expansion stroke of said piston.

9. A lawn mower according to claim 1 wherein said valve control element comprises a rotatable member rotatably mounted in said engine block and including an internal flow passage having an inlet portion which is registerable with said outlet port and an outlet portion which is in communication with said discharge port and means for rotating said rotatable member between the first position where said inlet portion is in registration with said outlet port and a the second position where said inlet portion is out of registration with said outlet port, wherein said biasing means is operable to rotationally bias said rotatable member toward the first position, wherein said control means is operatively connected to said member and is operable, when in the non-operating position, to permit said biasing means to move said rotatable member to the first position, and wherein said valve assembly comprises a one-way check valve interposed said outlet and discharge ports and operable, when said rotatable member is in the first position, to permit gas flow from said combustion chamber to said discharge port during the compression stroke of said piston and to prevent gas flow from said discharge port into said combustion chamber during the expansion stroke of said piston.

10. A lawn mower according to claim 9 wherein said check valve means comprises a spring-loaded ball check valve disposed in said flow passage outlet portion of said rotatable member.

11. A lawn mower according to claim 1 including a handle mounted on said frame and including a portion, and wherein said control member is movably mounted on said handle, said control member including a part located, when said valve control element is in the second position, in an operating position adjacent said handle portion and located, when said valve control element is in the first position, in a non-operating position spaced from said handle portion.

12. A lawn mower according to claim 1 wherein said control member is biased by said biasing means into the non-operating position.

13. A lawn mower according to claim 1 wherein said engine includes a spark plug and an electrical circuit for supplying ignition current to said spark plug and a switch connected in said electrical circuit and being selectively operable to interrupt ignition current to said spark plug, and wherein one of said control means and said valve control element further includes means for operating said switch to interrupt said ignition circuit when said control means is the engine non-operating position or said valve control element is the first position.

* * * * *